E. H. GAGNON.
HAY RACK.
APPLICATION FILED MAY 6, 1914.
1,116,052.
Patented Nov. 3, 1914.
3 SHEETS—SHEET 1.
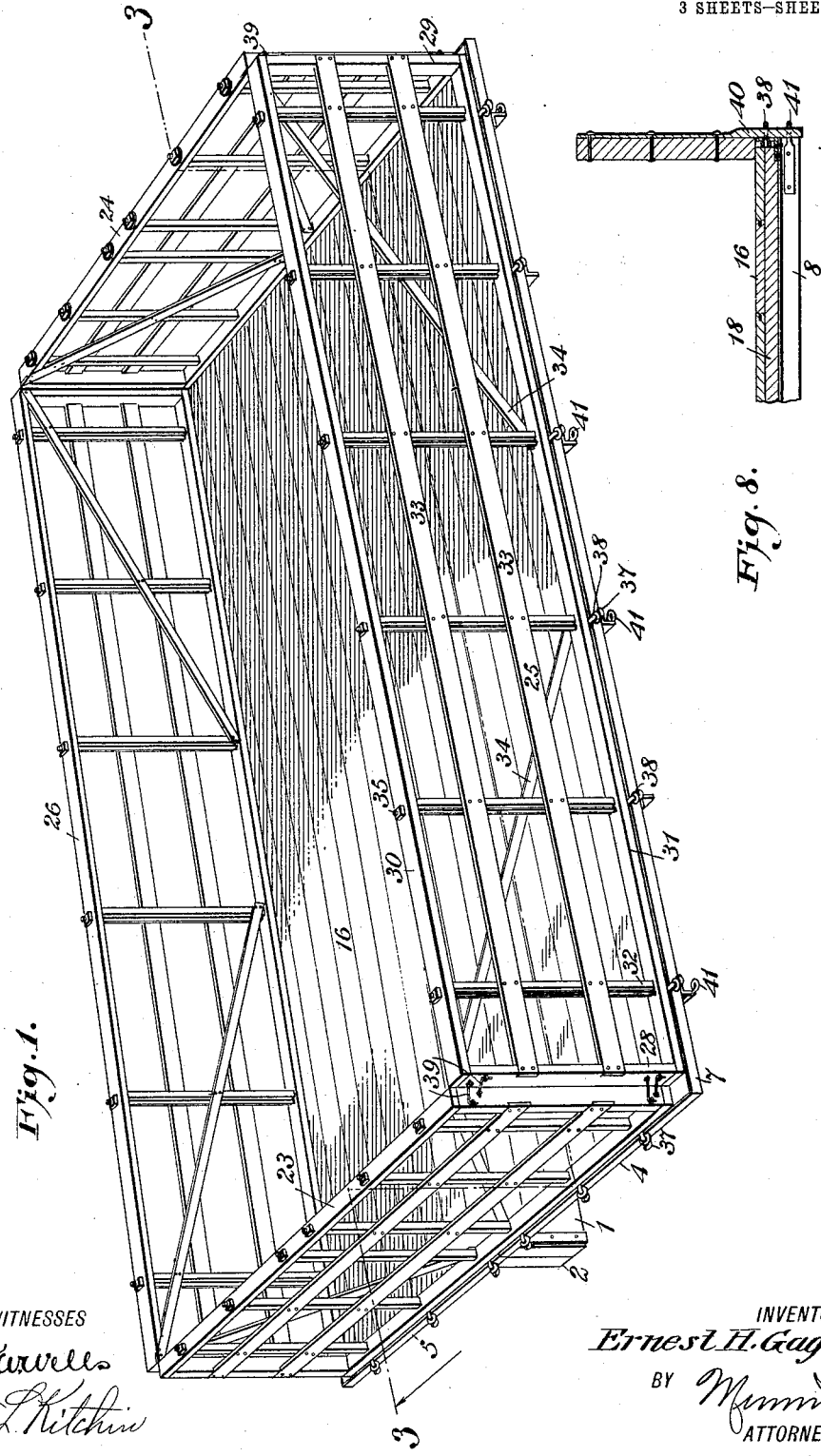
WITNESSES
INVENTOR
Ernest H. Gagnon
BY
ATTORNEYS

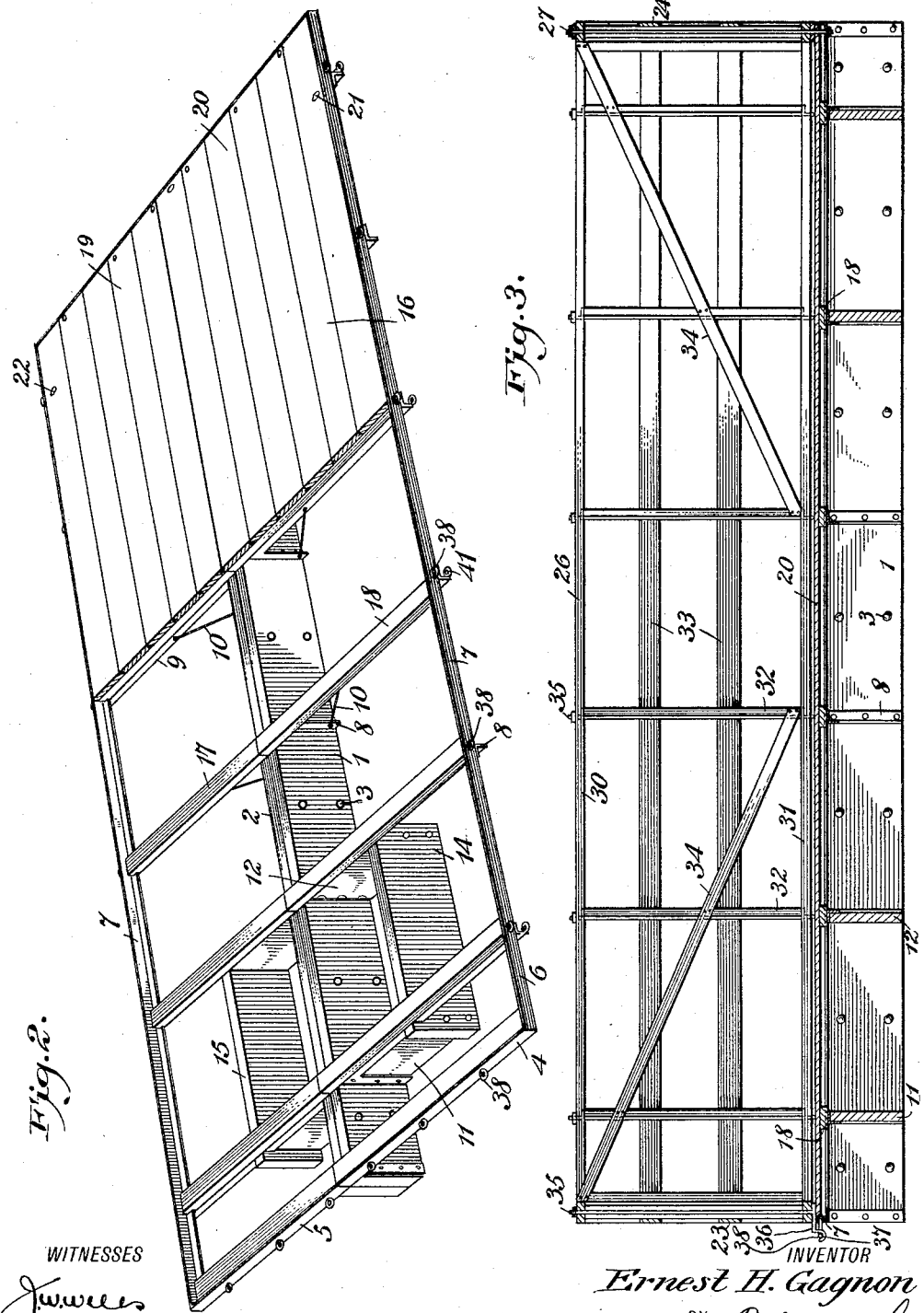

E. H. GAGNON.
HAY RACK.
APPLICATION FILED MAY 6, 1914.
1,116,052.
Patented Nov. 3, 1914.
3 SHEETS—SHEET 3.
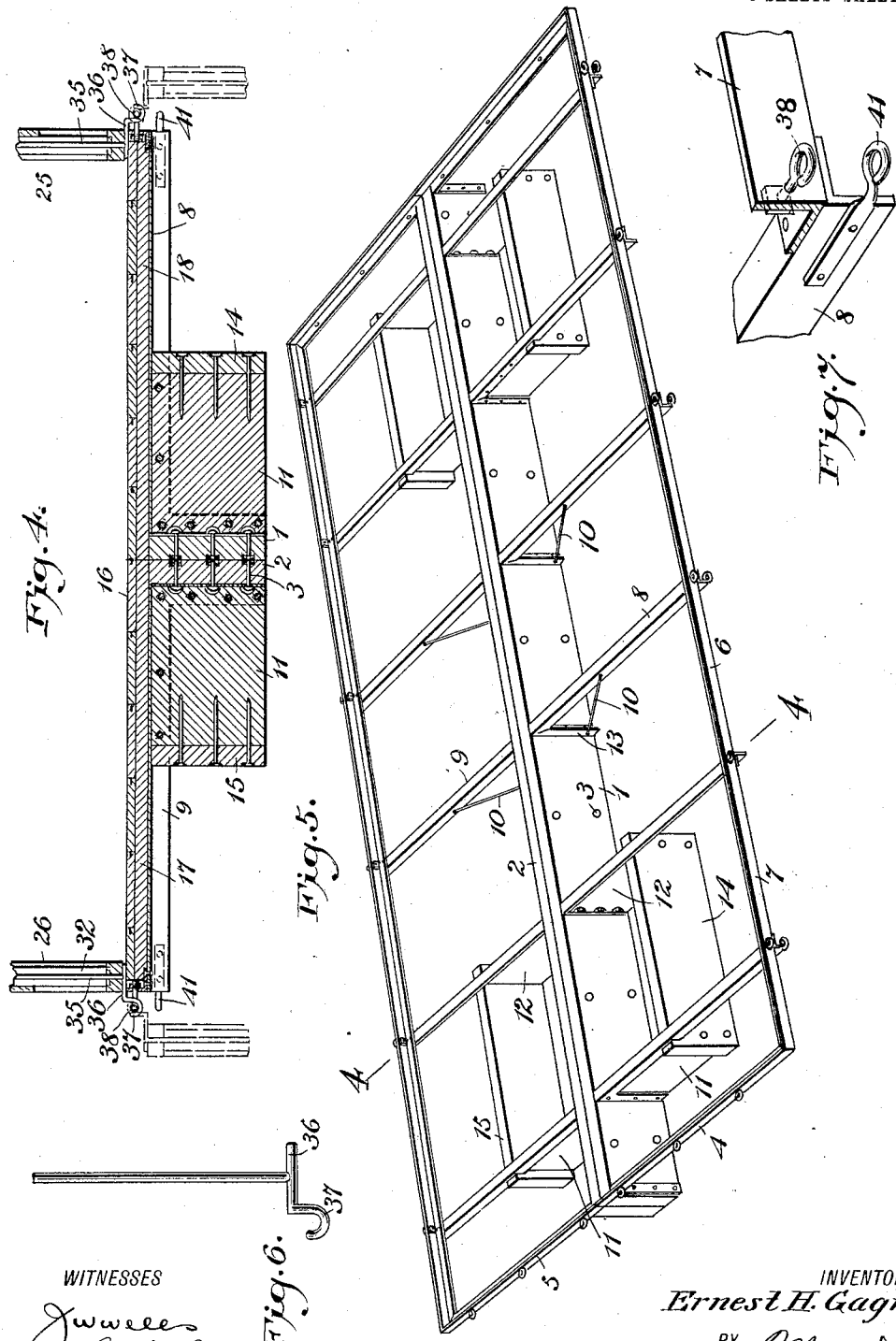
WITNESSES
INVENTOR
Ernest H. Gagnon
BY
ATTORNEYS

UNITED STATES PATENT OFFICE.

ERNEST H. GAGNON, OF BILLINGS, MONTANA.

HAY-RACK.

1,116,052.  Specification of Letters Patent.  Patented Nov. 3, 1914.

Application filed May 6, 1914. Serial No. 836,662.

*To all whom it may concern:*

Be it known that I, ERNEST H. GAGNON, a citizen of the United States, and a resident of Billings, in the county of Yellowstone and State of Montana, have invented a new and Improved Hay-Rack, of which the following is a full, clear, and exact description.

This invention relates to improvements in hay racks, and has for an object to provide an improved structure which may be readily placed in position upon the wagon and readily and easily removed.

Another object of the invention is to provide a structure which is comparatively light but strong and adapted to receive loads of different material in addition to hay.

Another object of the invention is to provide a rack with a bottom and with folding sides and ends, said sides and ends being designed to be not only folded but bodily removed whenever desired.

A further object of the invention is to provide a hay rack with the bottom formed in sections, and with removable sides and a rear end, whereby when the sides and rear end are removed the load on the rack may be tied to a fixed member and the rack pulled from beneath the load, thus quickly unloading the rack.

A still further object of the invention is to provide a hay rack with a solid bottom and with movable openwork sides and auxiliary solid sides designed to be substituted at any time for the openwork sides, whereby granular matter may be carried by the hay rack as well as hay and other loose matter.

In the accompanying drawings—Figure 1 is a perspective view of a hay rack embodying the invention; Fig. 2 is a perspective view showing the base of the rack shown in Fig. 1 together with part of the bottom; Fig. 3 is a longitudinal vertical section through the structure shown in Fig. 1 approximately on line 3—3; Fig. 4 is a transverse section through Fig. 5 approximately on line 4—4; Fig. 5 is a perspective view of the base of the hay rack shown in Fig. 1; Fig. 6 is a detailed fragmentary side view of one of the retaining hooks associated with the sides of the rack shown in Fig. 1; Fig. 7 is a detailed fragmentary perspective view of the eyelets and associated devices embodying certain features of the invention; Fig. 8 is a detailed fragmentary sectional view of a slightly modified form of side member showing a solid structure.

Referring to the accompanying drawings by numeral, 1 and 2 indicate centrally arranged beams which may be formed of any material, but preferably of wood. These beams are secured by any desired means, but preferably by bolts 3, whereby the sections 4 and 5 of the base 6 may be more easily handled and more easily stored in case it is desired to store the same. Associated with the beams 1 and 2 is a frame 7 formed preferably of angle iron, each part of the respective halves of the frame being rigidly connected with the respective beams 1 and 2. Extending from beam 1 to frame 7 are a plurality of braces 8, while extending from beam 2 to frame 7 are a plurality of braces 9. The center braces 8 and 9 are provided with diagonal bracing bars 10, while the end braces 8 and 9 are provided with beams 11 and 12, said beams being preferably of wood. All of the braces 8 and 9 are formed with a turned-down portion 13 which is rigidly secured to the respective beams 1 and 2, while the outer end is riveted or bolted to the frame 7. The outer ends of the bracing beams 11 and 12 have secured thereto the connecting beams 14 and 15 which act as supporting runners for engaging the bolster or other suitable part of the wagon when the rack is in use. The runners 14 and 15 are secured to beams 11 and 12 by any desired means, as for instance by being nailed thereto as shown in Fig. 4. These beams are also connected with the braces 8 and 9 by suitable bolts along the inner end of the beams, and also along the upper end, such connection being shown in Fig. 4. It is to be noted that the runners 14 and 15 and associated devices are provided adjacent each end of the base 6 so as to engage the front and the rear bolster of the wagon.

Arranged on the base 6 is a bottom 16 which bottom is formed with cross bars 17 and 18 for the respective braces 8 and 9 and flooring sections 19 and 20 for the respective sections 4 and 5 of the base, the flooring sections 19 and 20 being preferably rigidly secured to cross bars 17 and 18. The bottom 16 is preferably made of a size to fit within the frame 7 of base 16, and is held against any accidental dislodgment by suitable bolts 21 and 22 extending through the flooring and also through the framing of angle irons 7.

Associated with the base and bottom are ends 23 and 24 (Figs. 1 and 3) and sides 25 and 26. The end 24 is designed to be the front end and is formed with any suitable kind of uprights, and with a top part and a base part, thus producing an openwork framing, which framing is held in place by a plurality of bolts 27 extending through the angle iron frame 7, as more clearly shown in Fig. 3. The sides 25 and 26 are provided with ends 28 and 29, a top 30 and a bottom 31, and suitable uprights 32. Connected to the end members 28 and 29, and also to the uprights 32 are strips 33. Suitable diagonal braces 34 are also provided whereby the entire frame is comparatively rigid. A plurality of specially constructed bolts 35 are provided for each of the frames 25 and 26, which frames are identical in construction. The bolts 35 are provided at the upper end with threads for receiving a nut in the usual manner. The lower ends of these bolts are formed as shown in Fig. 6, namely, with cross members 36 and a hooked portion 37. The hooked portion 37 is designed to pass through the eyelets 38 rigidly secured to the angle iron frame 7. These eyelets may be secured to the angle iron frame 7 in any desired manner, as for instance by having the end thereof inserted through an aperture and a suitable bolt threaded on to the end (Fig. 3). Not only are the side members 25 and 26 constructed and mounted as just described, but also the end 23 is constructed and mounted in a similar manner, whereby these three members may be easily and quickly applied and removed at any time. In order to prevent the ends and sides from falling away to the dotted position shown in Fig. 4 suitable connecting and locking hooks 39 are provided at each end of each of the sides and each of the ends. When it is desired to remove a load from, for instance, one side, that particular side is lowered to the position shown in dotted lines in Fig. 4 and the load removed. If desired, the side may not only be lowered but may be entirely removed without removing the ends or the opposite side. However, when a load of hay or other material is on the rack and it is desired to remove the entire load quickly, a rope or other securing means is passed around the load and then tied or otherwise secured to a fixed member. The sides and the rear end are then removed, after which the rack is drawn from beneath the load. In case it is desired to hold granular matter or anything requiring a solid support and also solid sides, the sides and ends shown in Fig. 1 are removed and solid sides and ends are substituted, as for instance shown in Fig. 8. These solid sides and ends are provided with a plurality of pins 40 which extend through not only eyelets 38 but also eyelets 41, the detailed structure of which is shown in Fig. 7. Eyelets 41 are connected in any desired manner to the braces 8 and 9 and act as steadying members for the sides and ends when used. If desired, the connecting hooks 39 could be used for locking the end portions of the sides and ends properly in place.

In forming the base it will be noticed that the longitudinal beams 1 and 2 are arranged centrally of the base and the supporting beams or runners are comparatively short so that the rack may be properly supported and yet allow the wheels of the wagon to move beneath the rack when the wagon is turning around. This will allow a short turn to the device which would not be permitted if the runners 14 and 15 extended for the full length of the rack as found in racks now in use.

What I claim is—

1. In a hay rack of the character described, a base formed into two parts, each of said parts having an outside framing, longitudinal beams, said framing being connected to said longitudinal beams at each end, a plurality of braces extending from said framing to said beams, and a pair of runners arranged adjacent each end of said framing, means for connecting said frames together for making a rigid base, and means for connecting the side and end members to said base.

2. In a hay rack of the character described, a supporting base, a bottom for said base, said bottom being formed into a pair of sections, each section having a flooring and transverse ribs, said transverse ribs resting on the framework of said base, a pair of sides and a pair of ends, means arranged on the respective sides and ends for connecting the same with said base, and means for connecting the contact portions of the sides and ends together.

3. In a hay rack of the character described, a base formed in two sections, each of said sections being along one side, longitudinal beams, a plurality of bracing bars extending at right angles from said beams, a framing connecting the outer ends of said bracing bars, and a supporting runner structure adjacent each end of said sections, means for rigidly securing said beams together, whereby said sections are united for forming a complete base, and a bottom structure mounted on said base.

4. In a hay rack of the character described, a base formed in a plurality of sections, means for rigidly connecting said sections together, each of said sections having a longitudinally arranged bracing beam, a plurality of bracing bars extending at right angles to each of said beams, a frame connecting the outer end of said bracing bars, a supporting runner arranged adjacent each end of each of said sections, said supporting runner being spaced from said bracing beams and supported by said bracing bars, side members adapted to be connected with said frame, and means for connecting said side members with said frame.

5. In a hay rack of the character described, a base formed with a plurality of sections, each of said sections having a longitudinal beam, a supporting runner arranged adjacent each end, a pair of lateral bracing and supporting bars, and means for connecting said lateral supporting and bracing bars to said runners and to said beam.

In testimony whereof I have signed my name to this specification in the presence of two subscribing witnesses.

ERNEST H. GAGNON.

Witnesses:
A. L. KITCHIN,
PHILIP D. ROLLHAUS.